United States Patent [19]
Nishi et al.

[11] Patent Number: 5,729,330
[45] Date of Patent: Mar. 17, 1998

[54] NEGATIVE FILM MASK APPARATUS WITH MAGNETIC PROPERTIES

[75] Inventors: Kouji Nishi, Wakayama; Mitsuhiko Itojima, Naga-gun, both of Japan

[73] Assignee: Noritsu Koki Co., Ltd., Wakayama, Japan

[21] Appl. No.: 589,004

[22] Filed: Jan. 19, 1996

[30] Foreign Application Priority Data

Jan. 20, 1995 [JP] Japan ................. 7-026278

[51] Int. Cl.⁶ ............................. G03B 27/62
[52] U.S. Cl. ........................................ 355/75
[58] Field of Search ................... 355/72, 74, 75, 355/122, 125, 128, 129

[56] References Cited

U.S. PATENT DOCUMENTS

| | | | |
|---|---|---|---|
| 3,984,186 | 10/1976 | Momose et al. | 355/45 |
| 4,396,281 | 8/1983 | Okabe et al. | 355/75 |
| 5,162,926 | 11/1992 | Yeadon et al. | 355/75 X |
| 5,343,273 | 8/1994 | Yamamoto et al. | 355/75 |

*Primary Examiner*—Fred L. Braun
*Attorney, Agent, or Firm*—Oblon, Spivak, McClelland, Maier & Neustadt, P.C.

[57] ABSTRACT

A magnet is provided on either a negative film mask or a negative film mask table of a negative film mask apparatus, and a magnetic material is provided on the other of these. When the negative film mask in which a negative film has been loaded is placed on the negative film mask table, the negative film mask is held in place by a magnetic force. The negative film mask apparatus is provided with a stopper. The stopper is adapted to press a closely-contacting member against a sliding surface of the negative film mask table when necessary, thereby preventing the negative film mask from sliding. The closely-contacting member is made of a material such as rubber so that it can closely contact a sliding surface of the negative film mask table. Further, a magnetic member is included in the stopper. The stopper generates a large frictional force utilizing pressing force and magnetic force. Therefore, the negative film mask can be stably held in place in a state in which the negative film mask and the negative film mask table are inclined. Also, the large frictional force makes it possible to stably hold the negative film mask in place against a magnetic force which acts on the negative film mask in a horizontal direction.

2 Claims, 8 Drawing Sheets

NEGATIVE FILM MASK APPARATUS WITH MAGNETIC PROPERTIES

BACKGROUND OF THE INVENTION

1. Field of the Invention

The present invention relates to a negative film mask apparatus of a photographic printer which is provided with a negative film mask for cropping.

2. Description of the Related Art

A conventional negative film mask apparatus used for photographic printing work including cropping is provided with a film holding mechanism. When a negative film mask holding a negative film is placed on a negative film mask table, the negative film mask is held in place by magnetic force. The negative film mask has an opening corresponding to a frame of a negative film while the negative film mask table has an opening which has been predetermined taking a cropping operation into consideration. Light emitted from a light source passes through a print area of the negative film which is determined by these openings, and is then irradiated onto a printing paper.

Since a magnetic force is produced such that the negative film mask is attracted by the negative film mask table, the negative film mask can be held in place once the negative film mask is placed on the upper surface of the negative film mask table at an appropriate position. Therefore, the cropping operation can be performed by sliding and/or rotating the negative film mask in a predetermined area. The magnetic force is obtained by disposing a magnet on either the negative film mask or the negative film mask table and a magnetic material on the other of these.

An example of such a negative film mask apparatus utilizing magnetic force is disclosed in Japanese Patent Application Laid-Open No. 56-36643. In this apparatus, a magnetic force has been newly utilized as the mechanism for holding a negative film. In detail, a metal plate is provided along the circumferential edge of the negative film mask for holding a negative film such that the metal plate surrounds an opening for exposing a frame of the negative film. A looped magnet is provided in a frame disposed on the light source side such that the looped magnet surrounds the optical axis. The metal plate is attracted by the magnet, thus providing fixation. The area in which the negative film mask can be attracted and held in place by the magnet varies depending on the sizes of the metal plate and the magnet and the relative position therebetween. Since the magnet for attracting the negative film mask and the metal plate is large and produces a large magnetic force, the negative film mask can be stably held in place even when the negative film mask is not horizontal.

The magnetic force produced between the metal plate and the magnet serves to attract the negative film mask when the center of the opening of the negative film mask coincides with the optical axis. However, when the center of the opening of the negative film mask moves away from the optical axis, the component of the magnetic force which acts in a direction perpendicular to the metal plate to hold the metal plate in place decreases while the component in a direction parallel to the metal plate which moves the negative film mask such that the center of the opening coincides with the optical axis increases. The negative film mask is held in place by the friction between the metal plate and the magnet. When the center of the opening of the negative film mask moves far away from the optical axis and the balance between the magnetic force and the friction is upset, the negative film mask moves from the placed position. A cropping operation can be performed only within the area in which a sufficient friction is produced between the magnet and the negative film mask so as to resist the magnetic force acting in the direction parallel to the metal plate, thereby stably holding the negative film mask at the placed position.

In the film carrier for a photographic printer disclosed in Japanese Patent Application Laid-Open No. 6-35081, a magnetic force is utilized to maintain the flatness of a negative film held by a negative film mask and to stably hold the negative film mask onto a negative film mask table. Further, this apparatus has a device for preventing the negative film mask from wearing when the negative film mask is moved for cropping. The negative film mask is composed of a mask plate having permanent magnets, and a thick metal plate made of a magnetic material. A metal mask base made of a magnetic material is used as a negative film mask table. After a negative film is placed on the mask plate of the negative film mask and is pressed by the thick metal plate, the negative film mask is placed on the slide surface of the metal mask base. As a result, the thick metal plate is attracted by the permanent magnet provided in the bottom surface of the mask plate so that the film is held in a flattened state. Also, the negative film mask is held onto the mask base by the attraction force. To prevent the mask plate and the mask base from wearing, the bottom surface of the mask plate is subjected to wear resistance treatment.

In this apparatus, since the negative film mask is placed on the horizontal upper surface of the mask base and small magnets are used, the negative film mask is attracted by the mask base with an appropriate force. This realizes smooth sliding of the negative film mask and prevents the wear of the negative film mask and the mask base. In addition, due to the wear resistance treatment given to the mask plate, smooth sliding of the negative film mask and generation of a proper friction are guaranteed even when the negative film mask apparatus is used frequently. Since the magnetic force acting in a direction parallel to the negative film mask is small, there is no possibility of the negative film mask shifting from a cropping position. Therefore, the negative film mask apparatus is stable during cropping. The area of movement of the negative film mask can be increased by using a mask base having a larger slide surface.

In the negative film mask apparatus disclosed in Japanese Patent Application Laid-Open No. 7-120844, plates made of a magnetic material are bonded along the circumferential edge of an opening of a negative film mask and movable magnets are provided in a mask base of a negative film mask table so as to widen the area within which a cropping operation can be performed. The negative film mask has a stopper using an elastic material which is presses against the mask base at two different positions. This structure increases stability in holding the negative film mask at a cropping position, and stability in holding the negative film mask in an inclined state.

Plates made of a magnetic material are attached on the surface of the negative film mask facing the mask base, and two stoppers each having a small rubber block are provided along one of the longer sides. The stoppers are closely contacted with the mask base by a pushing force generated by an elastic member. In a state in which the pushing force of the elastic member is removed, the small rubber blocks of the stopper stay within the negative film mask. When the stoppers are pushed by the elastic member, the rubber blocks project from the negative film mask and closely contact the mask base so as to fix the negative film mask at two locations. At each of the sides of the mask base intersecting the transport direction Y of a negative film, there is provided a guide extending in the transport direction Y of the negative film, and one magnet is fitted into the guide for movement therein. At the side of the mask base parallel to the transport direction Y of the negative film, two guides extending in the widthwise direction X of the negative film are provided. One magnet is fitted into each of the guides for movement therein.

When magnets are provided on the mask base, larger magnets can be used. Thus, a larger magnetic force for attracting the negative film mask can be obtained. The magnets are moved within the respective guides so as to adjust the magnetic force acting in a direction parallel to the negative film mask. A frictional resistance is produced between the mask base and the small rubber blocks which are closely contacted with the mask base by the stoppers. The movable magnets and the stoppers widen the area within which cropping can be performed. The negative film mask can be held in place even when the negative film mask is inclined.

As described above, conventional negative film mask apparatuses employ ingenious negative film mask holding mechanisms so as to expand the cropping area and to increase stability in holding the negative film mask in place.

However, since a larger magnetic force is needed to stabilize the holding of the negative film mask, the magnetic force acting in the cropping area becomes unevenly distributed. Therefore, the area for cropping decreases, and there is the possibility that the negative film mask placed at a cropping position will shift due to the magnetic force. Also, since the friction generated while the negative film mask is moved to a cropping position increases, smooth movement cannot be obtained, and wear of the negative film mask occurs. When magnets producing a small magnetic force are used to expand the cropping area, the stability in holding the negative film mask in place decreases, and it becomes difficult to place the negative film mask in an inclined state.

In the negative film mask apparatus disclosed in Japanese Patent Application Laid-Open No. 7-120844, the combination of the movable magnets and the stoppers provide stability in holding the negative film mask at a cropping position as well as stability in holding the negative film mask in an inclined state. However, the stoppers, in which small rubber blocks are pressed against the mask base at two positions, cannot produce a sufficient frictional resistance. Therefore, the negative film mask cannot be held stably when the inclination of the negative film mask is large.

SUMMARY OF THE INVENTION

An object of the present invention is to provide a negative film mask apparatus for a photographic printer which has an enlarged cropping area within which a cropping operation can be performed and which can stably hold an inclined negative film mask at a cropping position.

To achieve the above-described object, the present invention provides a negative film mask apparatus in which a magnet is provided on either a negative film mask or a negative film mask table, and a magnetic material is provided on the other of these. When the negative film mask in which a negative film has been loaded is placed on the negative film mask table, the negative film mask is held in place by a magnetic force. The negative film mask apparatus is provided with a stopper. The stopper is adapted to press a closely-contacting member against a sliding surface of the negative film mask table when necessary, thereby preventing the negative film mask from sliding. The closely-contacting member is made of a material such as rubber so that it can closely contact a sliding surface of the negative film mask table. Further, a magnetic member is included in the stopper. The stopper generates a large frictional force utilizing pressing force and magnetic force. Therefore, the negative film mask can be stably held in place in a state in which the negative film mask and the negative film mask table are inclined. Also, the large frictional force makes it possible to stably hold the negative film mask in place against a magnetic force which acts on the negative film mask in a horizontal direction.

The larger the area of close contact between the stopper and the sliding surface of the negative film mask table, the larger the pressing force that can be generated. However, it is difficult to provide a large stopper on a small negative film mask. When an elongated pressing surface is provided along one side of the negative film mask, a sufficient pressing force can be obtained. When the magnetic force acting on the magnetic material of the stopper is excessively strong, it becomes impossible to break contact between the magnetic film mask and the negative film mask table. Therefore, it is preferred that an intermediate member be inserted between the closely-contacting member and the magnetic member of the stopper to adjust the magnetic force. When an elastic member such as rubber is used as the intermediate member, cushioning performance can be obtained as well as adjustment of the magnetic force.

When magnets are provided on the negative film mask table, a stationary magnet and a movable magnet are used in combination so as to produce a magnetic force over an area required for cropping. Attractive plates made of a magnetic material are properly disposed on the negative film mask taking account of the area within which the magnetic force acts. Since the stationary magnet and the movable magnet are combined such that magnetic forces acting horizontally on the negative film mask are balanced, the position of the negative film mask does not shift even when magnets producing a relatively large magnetic force are used. This makes it possible to hold the negative film mask securely in place even when the negative film mask is inclined at a steep angle. When a magnetic force is generated to act evenly between the negative film mask and the negative film mask table, the negative film mask can be held more stably while expanding the area within which cropping can be performed.

When magnets are provided on the negative film mask, the negative film mask table is required to have a sliding surface which the magnets can attract. Therefore, the negative film mask table has a structure in which the sliding surface is formed by an attractive plate made of a magnetic material. The attractive plate has a shape corresponding to the sliding surface of the negative film mask table, and has an opening serving as an optical path. The attractive plate is attached to the upper surface or to the bottom surface of the negative film mask table. When the attractive plate is attached to the bottom surface of the negative film mask table, the sliding portion of the negative film mask table must have a shape and be made of a material allowing magnetic force to pass through the sliding portion. Since the negative film mask table is not required to be made entirely of a magnetic material, an existing negative film mask and negative film mask table can be utilized. A negative film mask apparatus can be obtained by attaching magnets and an attractive plate to the existing negative film mask and negative film mask table.

In the present invention, a negative film mask apparatus can be obtained by freely combining a stopper including a magnetic material, a negative film mask table with stationary and movable magnets, and a negative film mask table having a sliding surface made of a magnetic material. The present invention is applicable to all kinds of photographic printers in which cropping is performed.

BRIEF DESCRIPTION OF THE DRAWINGS

Various other objects, features and many of the attendant advantages of the present invention will be readily appreciated as the same becomes better understood by referring to the following detailed description of the preferred embodiments when considered in connection with the accompanying drawings, in which.

DETAILED DESCRIPTION OF THE PREFERRED EMBODIMENTS

Embodiments of the present invention will now be described with reference to the accompanying drawings.

The materials of the respective portions are non-magnetic unless the material is specified.

Figure 1:
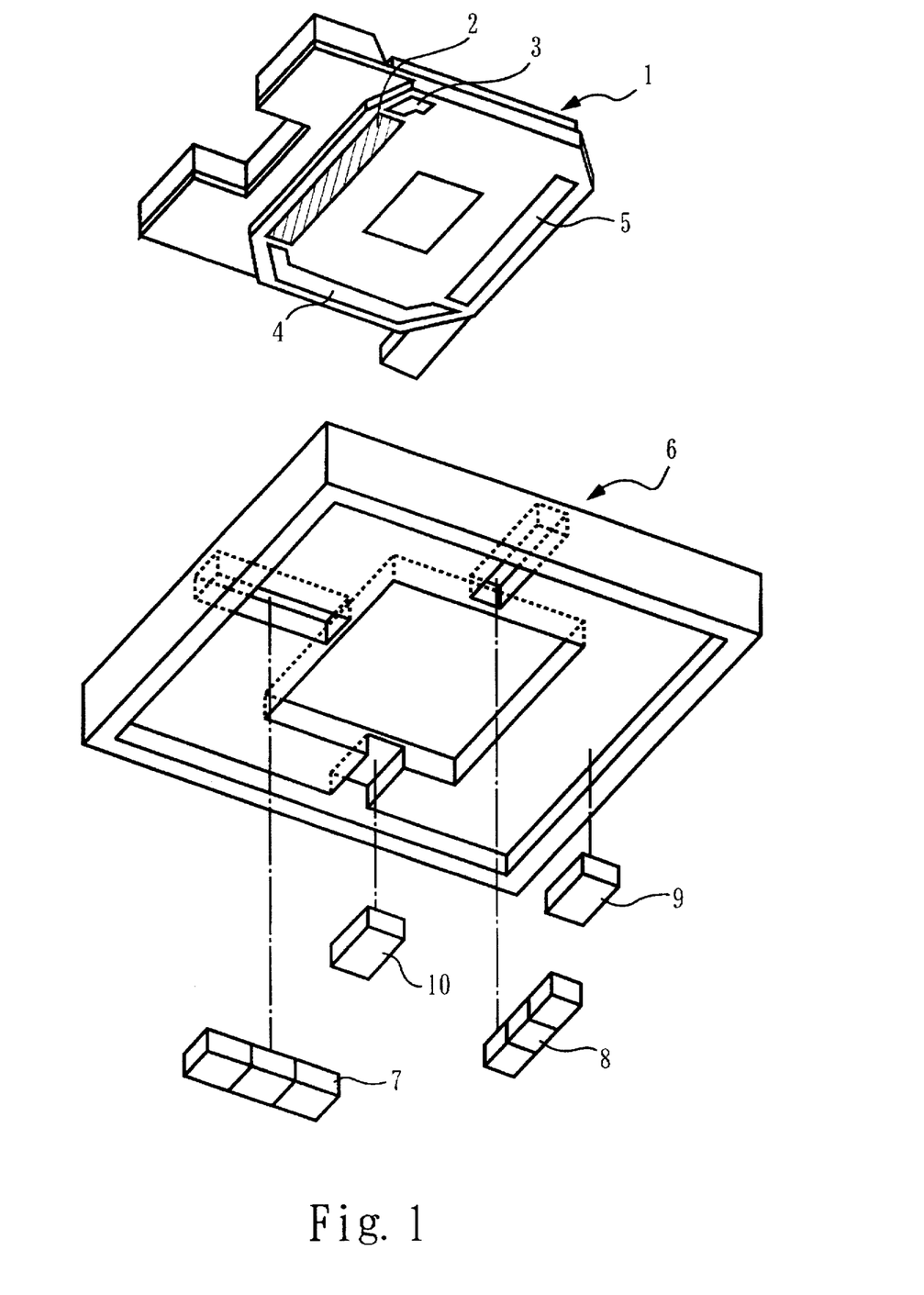
FIG. 1 is an exploded perspective view showing the structure of a negative film mask apparatus according to a first embodiment of the present invention.

First Embodiment:

FIG. 1 is an exploded perspective view showing the structure of a negative film mask apparatus according to a first embodiment of the present invention, as viewed from the side of an exposure table. An elongated stopper rubber 2 is provided along one side of a negative film mask 1 such that it projects from the bottom surface of the negative film mask 1. The stopper rubber 2 serves as a closely-contacting member. Three attractive plates 3, 4 and 5 made of a magnetic material are also provided. The attractive plate 3 is bonded to the negative film mask 1 at a corner adjacent to one end of the stopper rubber 2. The attractive plate 5 is bonded to the negative film mask 1 such that it extends along the side opposite to the side containing the stopper rubber 2. The attractive plate 4 is boned to the negative film mask 1 such that it extends along a side perpendicular to the stopper rubber 2 and the attractive plate 5, and opposite the side containing the attractive plates 3. The layout of these attractive plates is determined taking account of magnetic force of magnets provided on a negative film mask table 6.

The negative film mask table 6 is provided with two large magnets 7 and 8, and two small magnets 9 and 10. The magnet 7 is provided at a location where the stopper rubber 2 of the negative film mask 1 contacts. The magnet 8 is provided at a location which corresponds to the side of the negative film mask 1 where neither the stopper rubber 2 nor any attractive plate is provided. The magnet 9 is provided at the side opposite to the magnet 7, and the magnet 10 is provided at the side opposite to the magnet 8. The larger magnets 7 and 8 and the small magnet 9 are stationary with respect to the negative film mask table 6 while the small magnet 10 is fitted into a groove and is movable.

Figure 2:
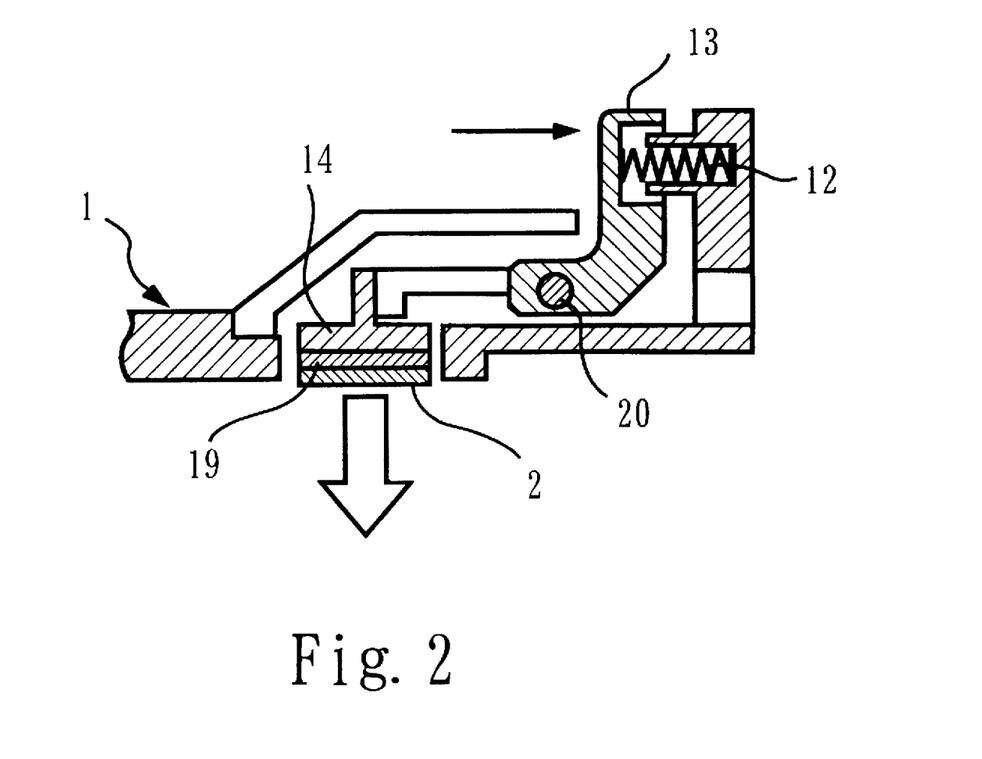
FIG. 2 is a sectional view of a stopper used in the negative film mask apparatus according to the first embodiment.

FIG. 2 is a sectional view of a stopper used in the negative film mask apparatus according to the first embodiment. In the present embodiment, a stopper is provided on the negative film mask 1. The stopper's main components include a compression spring 12, a stopper lever 13, a shaft 20, a stopper holder 14, and the above-described stopper rubber 2. The stopper lever 13 is connected to the stopper holder 14 via the shaft 20 so that the spring force of the compression spring 12 is transmitted to the stopper holder 14. By this force, the stopper rubber 2 is pressed against the negative film mask table 6. When the stopper lever 13 is pressed in the direction of the arrow as shown in FIG. 2, against the spring force of the compression spring 12, the contact between the stopper rubber 2 and the negative film mask table 6 is broken. Since the stopper holder 14 is made of a magnetic material such as iron, a magnetic force acts between the magnets on the negative film mask table 6 and the stopper holder 14, so that an attractive force can be obtained. The stopper rubber 2 attached to the stopper holder 14 via an intermediate rubber 19 generates a frictional force when it is pressed against the negative film mask holder 6. The intermediate rubber 19 attenuates the magnetic force properly, thereby adjusting the attractive force. The intermediate rubber 19 also serves as a cushion. Since the stopper rubber 2 is pressed against the negative film mask table 6 by a magnetic force of a proper magnitude and by a pressing force generated by the compression spring 12, the negative film mask 1 can be held stably in place. Also, the contact between the negative film mask 1 and the negative film mask table 6 can be easily broken.

Figure 3:
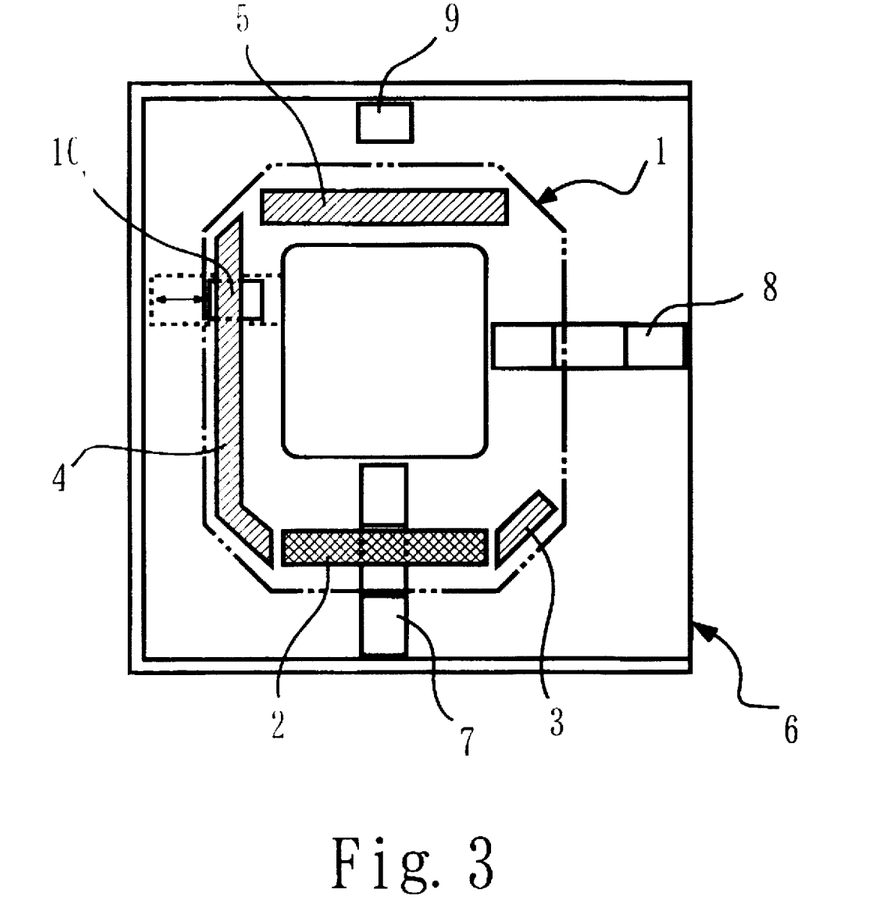
FIGS. 3 and 4 are see-through views of the negative film mask according to the first embodiment as viewed from the light source side.
Figure 4:
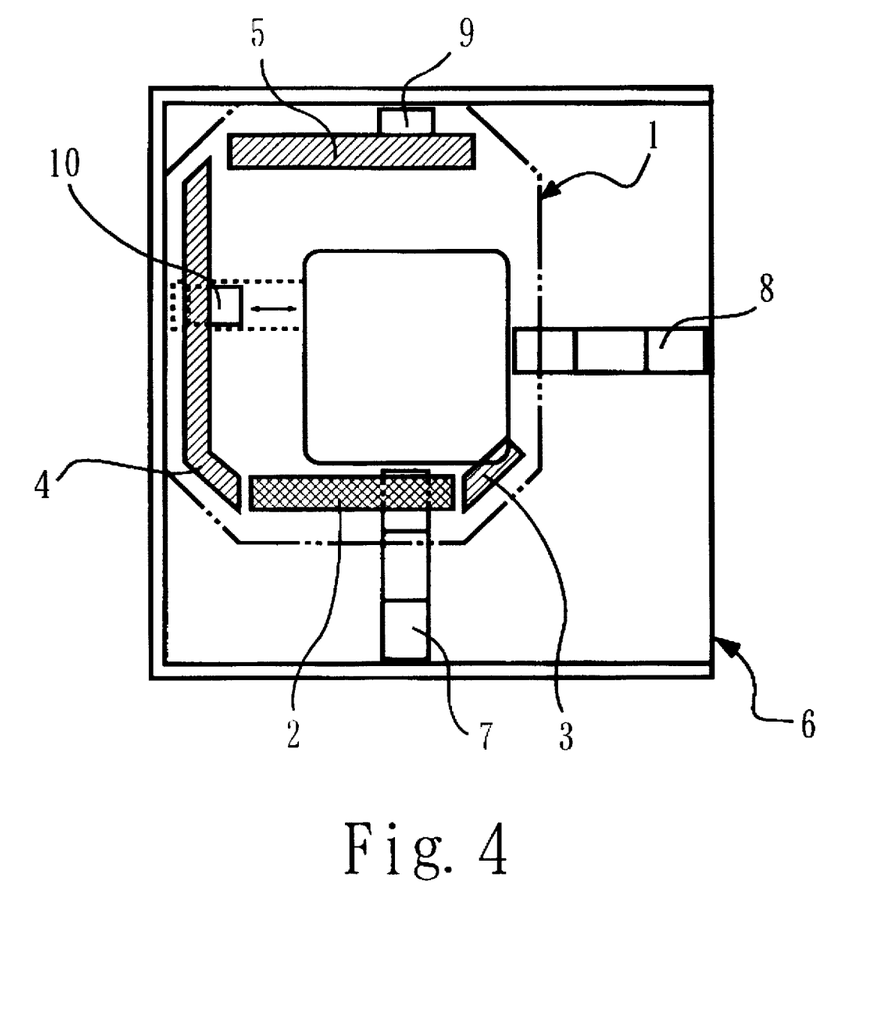

FIGS. 3 and 4 are see-through views of the negative film mask according to the first embodiment as viewed from the light source side. These drawings show the layout of the magnets and the attractive plates. In FIG. 3, the negative film mask 1 is placed on the negative film mask table 6 at a center position. The attractive plate 4 is attracted by the magnet 10. In this state, the negative film mask 1 can be moved in the longitudinal direction in FIG. 3 while maintaining the contact between the attractive plate 4 and the magnet 10. Since the magnet 10 is movable, the magnetic force generated by the magnet 10 acts in a wide area, comparable to the areas of the large magnets 7 and 8. Therefore, the negative film mask 1 can be moved in the lateral direction while maintaining the contact between the attractive plate 4 and the magnet 10. The elongated stopper rubber 2 is attracted by the magnet 7. Since the stopper rubber 2 extends in the lateral direction, the negative film mask 1 can be moved in the lateral direction while maintaining the contact between the stopper rubber 2 and the magnet 7. Also, since the magnet 7 extends in the longitudinal direction, the negative film mask 1 can be moved in the longitudinal direction while maintaining the contact between the stopper rubber 2 and the magnet 7.

In FIG. 4, the negative film mask 1 is placed on the negative film mask 6 at an upper left corner thereof. The stopper rubber 2 is attracted by the magnet 7, the attractive plate 4 is attracted by the magnet 10, and the attractive plate 5 is attracted by the magnet 9. Therefore, the negative film mask 1 can be fixed to the negative film mask table 6 in a stable manner. In the state shown in FIG. 4, the magnetic plate 3 and the magnet 8 are not effective. However, the magnetic plate 3 and the magnet 8 become effective when the negative film mask 1 is moved and/or rotated. Since the magnet 10 is movable, the magnetic force generated by the magnet 10 acts in a wide area, comparable to the areas of the large magnets 7 and 8, even though the size of the magnet 10 is small. Since a magnet having a relatively large size and a magnet having a relatively small size are disposed at opposite sides, the same attractive force can be obtained even when the negative film mask 1 is rotated 90°. Also, the attractive forces produced by the magnets are balanced due to interference therebetween. The layout of the attractive plates and the magnets is not limited to that of the present embodiment. The layout may be modified taking into consideration the area necessary for cropping such that the attractive plates are located in an area in which the magnetic forces of the magnets act.

Figure 5:
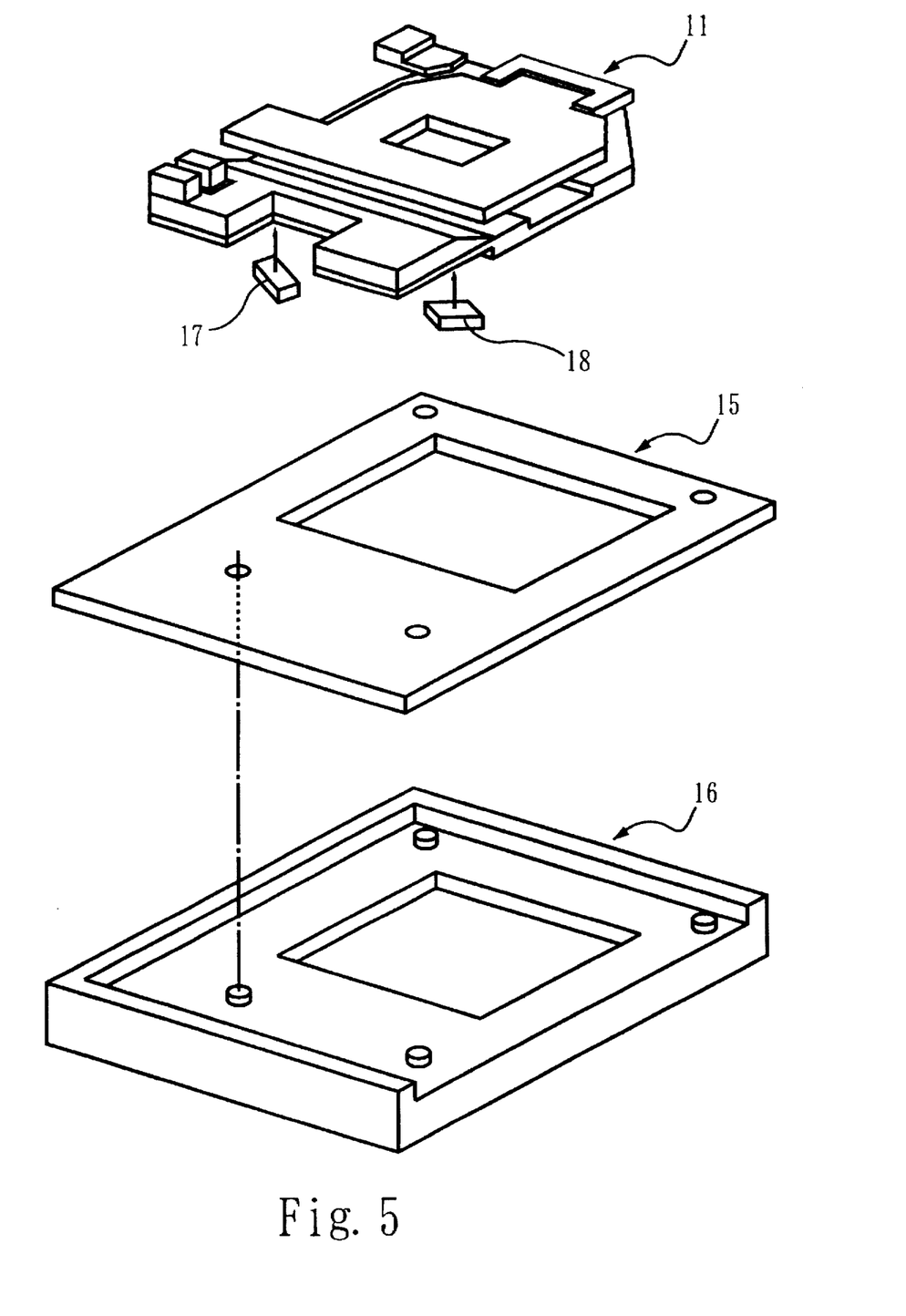
FIG. 5 is an exploded perspective view showing the structure of a negative film mask apparatus according to a second embodiment of the present invention.

Second Embodiment:

FIG. 5 is an exploded perspective view showing the structure of a negative film mask apparatus according to a second embodiment of the present invention. Unlike the first embodiment, magnets are provided on a negative film mask while an attractive plate is provided on the sliding surface of a negative film mask table. That is, the negative film mask table 16 is provided with an attractive plate 15 which covers the sliding surface of the negative film mask table 16. The negative film mask table 16 has an opening offset from the center thereof. The attractive plate 15 is inserted into the negative film mask table 16 from the side having no projected edge, and fixed to the negative film mask table 16 by screws or the like. An attractive surface is formed on one side of the opening in the longitudinal direction of the negative film mask table 16. A negative film mask 11 is held in place by placing the negative film mask 11 on the negative film mask table 16 such that the magnets on the negative film mask 11 are mainly located on the attractive surface. To cope with the offset of the attractive surface of the attractive plate 15 fixed to the negative film mask table 16, magnets 17 and 18 are attached to the negative film mask 11 at one side and a corner thereof.

Figure 6:
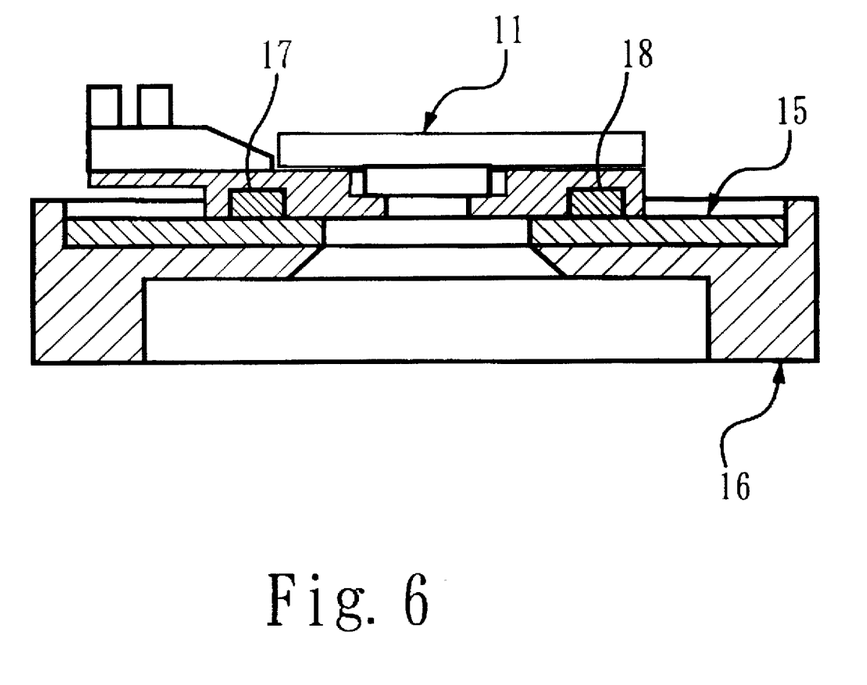
FIG. 6 is a sectional view of showing the structure of the negative film mask according to the second embodiment.

FIG. 6 is a sectional view showing the structure of the negative film mask according to the present embodiment. The attractive plate 15 is made of iron, which is a magnetic material, and the negative film mask table 16 is made of aluminum, which is a non-magnetic material. The magnets 17 and 18 are attached to the bottom surface of the negative film mask 11 which contacts the attractive plate 15. The magnets are disposed such that they always contact the attractive plate 15 when the negative film mask 11 is moved within a cropping area. Accordingly, the negative film mask 11 can be always held in place stably. The stopper used in the first embodiment can be used in the negative film mask apparatus according to the present embodiment. The negative film mask apparatus according to the present embodiment can be manufactured by attaching magnets and a attractive plate to an existing negative film mask and negative film mask table.

Figure 7:
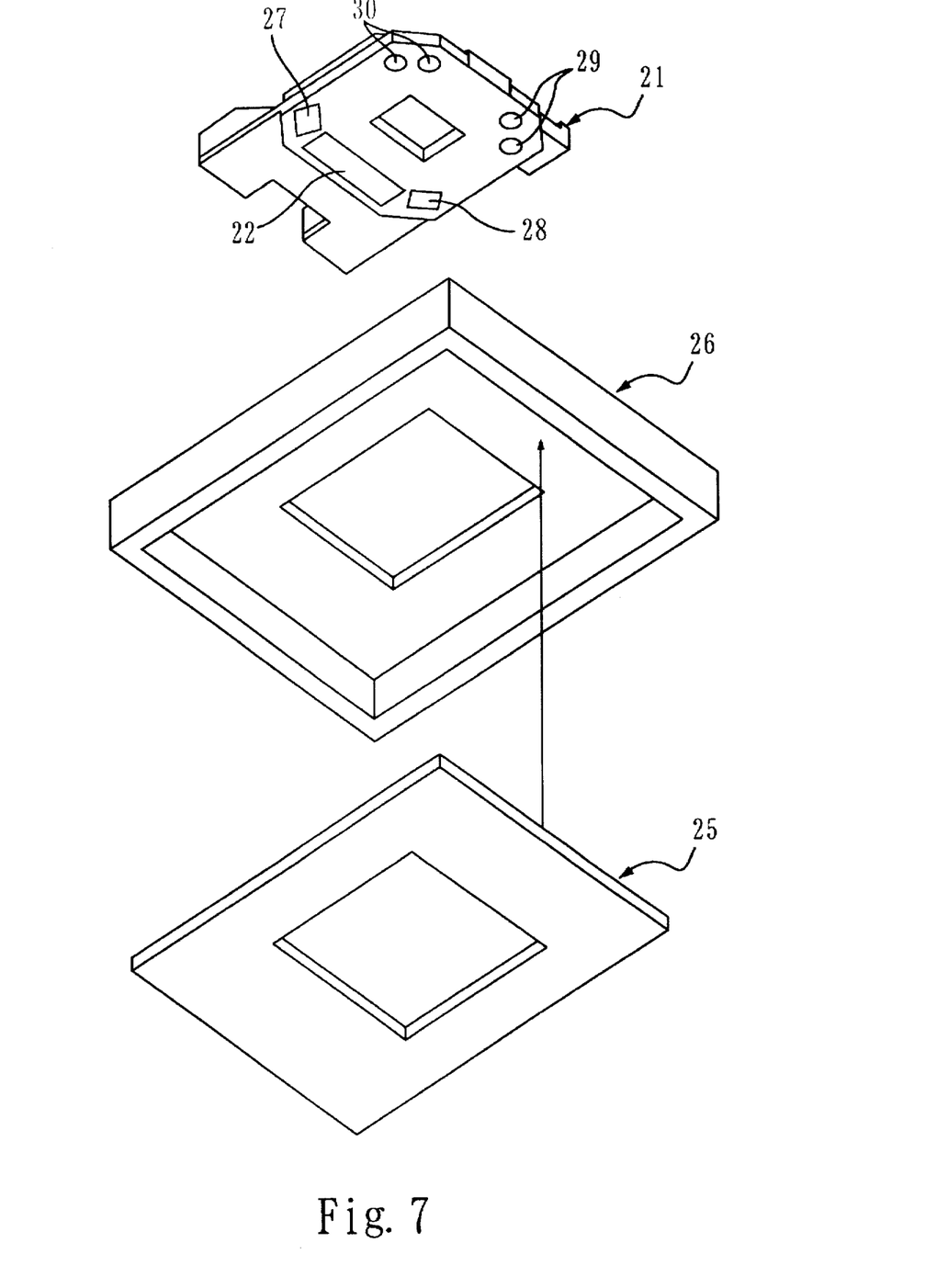
FIG. 7 is an exploded perspective view showing the structure of a negative film mask apparatus according to a third embodiment of the present invention.

Third Embodiment:

FIG. 7 is an exploded perspective view showing the structure of a negative film mask apparatus according to a third embodiment of the present invention. Magnets are provided on a negative film mask while an attractive plate is provided on the sliding surface of a negative film mask table, as in the second embodiment. In the present embodiment, however, the attractive plate is attached to the bottom side of the sliding portion of the negative film mask table. In detail, a stopper rubber 22 is provided at one side of a negative film mask 21 in the longitudinal direction of the negative film mask 21 such that the stopper rubber 22 projects from the bottom surface of the negative film mask 21. Further, magnets 27 and 28 having a sheet-like shape are attached to two corners located adjacent to opposite ends of the stopper rubber 22. A pair of small circular magnets 29 and a pair of small circular magnets 30 are attached to the remaining corners of the negative film mask 21. The negative film mask table 26 is provided with an attractive plate 25. The negative film mask table 26 has a circumferential edge extending from the bottom surface thereof. The attractive plate 25 is fitted into the space defined by the circumferential edge.

Figure 8:
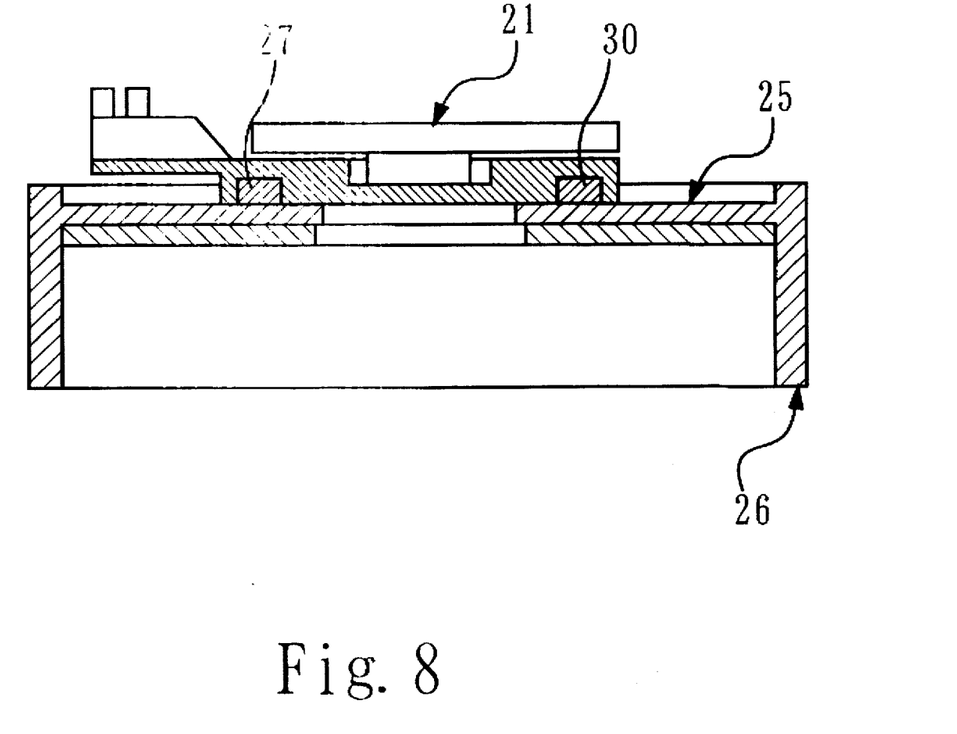
FIG. 8 is a sectional view of showing the structure of the negative film mask according to the third embodiment.

FIG. 8 is a sectional view showing the structure of the negative film mask according to the third embodiment of the present invention. The attractive plate 25 is made of iron, which is a magnetic material, and the negative film mask table 26 is made of aluminum, which is a non-magnetic material. The magnets 27 and 30 are attached to the bottom surface of the negative film mask 21 such that they contact the sliding surface of the negative film mask table. Other magnets are also attached to the negative film mask 21 in the same manner. The magnetic forces generated by these magnets act on the attractive plate 25 attached to the bottom side of the sliding portion while penetrating the negative film mask table 26. The magnets are disposed such that they always contact the attractive plate 25 when the negative film mask 21 is moved in a cropping area. Accordingly, the negative film mask 21 can be always held in place stably. The stopper used in the first embodiment is also used in the negative film mask apparatus according to the present embodiment. The negative film mask apparatus according to the present embodiment can be manufactured by attaching magnets and a attractive plate to an existing negative film mask and negative film mask table.

The present invention is not limited to the above-described embodiments, and encompasses negative film mask apparatuses in which the negative film mask is held on the negative film mask table using magnets and attractive plates made of a magnetic material, and a magnetic material is utilized in a stopper to prevent the negative film mask from sliding by pressing a rubber member or the like to the negative film mask table by a pressing force and a magnetic force; negative film mask apparatuses in which stationary magnets and magnets movably held in guide grooves are provided in the negative film mask table; and negative film mask apparatuses in which magnets are provided on the negative film mask and the part of the negative film mask table is made of a magnetic material.

As described above, in the negative film mask apparatus according to the present invention, a stopper utilizing a magnetic material is used in a mechanism which holds a negative film mask in place on the negative film mask table by a magnetic force acting between the negative film mask and the negative film mask table. The rubber member or the like of the stopper is pressed against the sliding surface of the negative film mask table, thereby fixing the negative film mask. Therefore, the negative film mask can be securely held in place in a stabilized manner. Since the stopper has a simple mechanism which utilizes a pressing force and a magnetic force, a large contacting force can be obtained, and the negative film mask can be easily separated from the negative film mask table.

When magnets are provided on the negative film mask table, stationary magnets and movable magnets are used in combination. Therefore, a magnetic force acts within a desired area. When the attractive plates made of a magnetic material are properly disposed on the negative film mask, a magnetic force acting the negative film mask in a horizontal direction is suppressed, so that the negative film mask is prevented from shifting. Therefore, the negative film mask can be stably held in place. Also, an area in which cropping can be performed is expanded. In the case where stationary magnets and movable magnets are provided on the negative film mask table, shifting of the negative film mask due to magnetic force does not occur even when magnets producing a large magnet force are used. The strong attractive force of the magnets makes it possible to hold the negative film mask at a steep angle. Similar effect can be obtained by using a stopper having a stopper rubber which generates a frictional force when being pressed against the negative film mask table. This effect can be enhanced by employing such a stopper in combination with a negative film mask with stationary magnets and movable magnets.

In the negative film mask apparatus according to the present invention, part of the negative film mask table is made of a magnetic material when magnets are provided on the negative film mask. Since the holding mechanism is simple, the negative film mask apparatus according to the present invention can be obtained by partly machining an existing negative film mask apparatus, and attaching magnets and magnetic materials thereto. This prevents an increase in costs. Also, the area in which cropping can be performed is freely set by changing the magnets and the magnetic material, or by changing the positions thereof.

Obviously, numerous modifications and variations of the present invention are possible in light of the above teachings. It is therefore to be understood that within the scope of the appended claims, the present invention may be practiced other than as specifically described herein.

What is claimed is:

1. A negative film mask apparatus used for cropping exposure in which a negative film mask is held in place on a negative film mask table by magnetic force, wherein said negative film mask has a stopper which is provided with a pressing mechanism and a closely-contacting member so as to prevent the negative film mask from sliding, and said closely-contacting member includes a magnetic material so that the closely-contacting member of said stopper is pressed, by magnetic force and pressing force, against a surface of said negative film mask table on which said negative film mask slides.

2. A negative film mask apparatus used for cropping exposure in which a negative film mask is held in place on a negative film mask table by magnetic force, wherein said negative film mask table comprises a stationary magnet and a movable magnet which is movable in a predetermined range, and wherein said negative film mask has a stopper which is provided with a pressing mechanism and a closely-contacting member so as to prevent the negative film mask from sliding, and said closely-contacting member includes a magnetic material so that the closely-contacting member of said stopper is pressed, by magnetic force and pressing force, against a surface of said negative film mask table on which said negative film mask slides.

* * * * *